US012077115B2

(12) United States Patent
Horibe et al.

(10) Patent No.: US 12,077,115 B2
(45) Date of Patent: Sep. 3, 2024

(54) WORK MACHINE (71) Applicant: KUBOTA CORPORATION, Osaka (JP)

(72) Inventors: Yuta Horibe, Duluth, GA (US); Min Sung Kim, Buford, GA (US); Douglas Swartz, Doraville, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/730,734

(22) Filed: Apr. 27, 2022

(65) Prior Publication Data
US 2023/0347843 A1    Nov. 2, 2023

(51) Int. Cl.
*B60R 19/26* (2006.01)
*B60K 13/04* (2006.01)

(52) U.S. Cl.
CPC .............. *B60R 19/26* (2013.01); *B60K 13/04* (2013.01); *B60Y 2200/223* (2013.01)

(58) Field of Classification Search
CPC ... B60R 19/26; B60R 19/02; B60R 2019/486; B60K 13/04; B60Y 2200/223; A01D 34/00
See application file for complete search history.

(56) References Cited

U.S. PATENT DOCUMENTS

| | | | | |
|---|---|---|---|---|
| 8,522,912 B2* | 9/2013 | Yamada | ................. | A01D 69/10 56/14.7 |
| 9,598,115 B2* | 3/2017 | Mildner | ................. | B62D 25/02 |
| 2004/0182063 A1* | 9/2004 | Myers | .................... | A01D 34/82 56/320.1 |
| 2008/0072558 A1* | 3/2008 | Tsuchihashi | ........... | A01D 34/82 56/14.7 |
| 2011/0131942 A1* | 6/2011 | Sugio | ..................... | A01D 34/71 56/320.2 |
| 2014/0014429 A1* | 1/2014 | Nogami | ................. | B62D 25/10 180/69.2 |
| 2016/0193912 A1* | 7/2016 | Minoura | ................ | B60K 13/04 180/309 |
| 2021/0122231 A1* | 4/2021 | Tanaka | ................... | F02M 35/06 |

FOREIGN PATENT DOCUMENTS

| | | | | | |
|---|---|---|---|---|---|
| EP | 3819150 A1 | * | 5/2021 | ............ | B60K 11/04 |
| JP | 2008099638 A | * | 5/2008 | | |
| JP | 2016-124427 A | | 7/2016 | | |
| JP | 2019217811 A | * | 12/2019 | | |
| JP | 6804184 B2 | * | 12/2020 | ............ | A01D 34/64 |

* cited by examiner

*Primary Examiner* — Amy R Weisberg
*Assistant Examiner* — Sara Laghlam
(74) *Attorney, Agent, or Firm* — Greenblum & Bernstein, P.L.C.

(57) ABSTRACT

A work machine includes: a body including: a body frame; an exhaust gas cleaning device disposed at a back portion of the body; and a bumper disposed at a back portion of the body and extending backward, wherein the exhaust gas cleaning device has a back end backward of a back end of the body frame, and the bumper has (i) a back end backward of the back end of the exhaust gas cleaning device and (ii) an upper end below an upper end of the body frame.

11 Claims, 11 Drawing Sheets

WORK MACHINE

TECHNICAL FIELD

The present invention relates to a work machine including an exhaust gas cleaning device backward of the driver's seat.

BACKGROUND ART

A known work machine including an exhaust gas cleaning device is disclosed in JP2016-124427A. The work machine includes a diesel engine and an exhaust gas cleaning device backward of the driver's seat.

The exhaust gas cleaning device, which is configured to clean exhaust gas from the engine, protrudes backward of the body frame in a side view, and is inside the engine hood.

SUMMARY OF INVENTION

The work machine of JP2016-124427A includes an engine hood made of a thin steel plate for a lighter weight as the engine hood needs to be opened and closed for maintenance of the work machine. Such an engine hood may not be strong enough to protect the exhaust gas cleaning device against a collision of the work machine with an obstacle. An excessively large bumper may, on the other hand, be inconvenient for the driver in driving the work machine backward or causing the work machine to make a turn, as it is difficult for the driver to perceive what is backward of the body.

The above circumstances have led to a demand for a work machine including a bumper that is compact but large enough to cover an exhaust gas cleaning device.

A work machine, including: a body including: a body frame; an exhaust gas cleaning device disposed at a back portion of the body; and a bumper disposed at a back portion of the body and extending backward, wherein the exhaust gas cleaning device has a back end backward of a back end of the body frame, and the bumper has (i) a back end backward of the back end of the exhaust gas cleaning device and (ii) an upper end below an upper end of the body frame.

With the above characteristic configuration, the bumper at a back portion of the body prevents the exhaust gas cleaning device from coming into contact with an obstacle.

The work machine may be arranged such that the bumper has left and right ends inward of left and right ends of the body frame in a rear view.

The above configuration allows the turn circle drawn by the back portion of the body to be small, and thereby prevents the bumper from laterally coming into contact with an obstacle when, for instance, the driver changes the direction of the body.

The work machine may be arranged such that the bumper has a lower end above a lower end of the body frame.

The above configuration prevents the bumper from accidentally coming into contact with an obstacle with which the exhaust gas cleaning device will not come into contact such as a ground unevenness.

The work machine may be arranged such that the bumper has a top face inclined such that a portion thereof farther backward is lower in position.

The above configuration prevents a person from being on the bumper, and thereby prevents damage to the bumper and accidents.

The work machine may be arranged such that the bumper includes: two supports including a left support and a right support, fixed to the body frame, and extending backward; and a bar extending in a left-right direction and supported by the supports.

The above configuration allows the bar to serve to protect the exhaust gas cleaning device as much as possible.

The work machine may be arranged such that the bar has left and right ends fixed inward of the supports.

The above configuration prevents, for example, rain water from laterally entering the bar.

The work machine may be arranged such that the supports are detachably attached to the body frame.

The above configuration allows the bumper alone to be replaced if, for instance, the bumper has been damaged.

DESCRIPTION OF EMBODIMENTS

The description below deals with a riding-type mower as an embodiment of the present invention with reference to drawings.

The drawings show "F" to indicate a forward direction, "B" to indicate a backward direction, "U" to indicate an upward direction, "D" to indicate a downward direction, "L" to indicate a leftward direction, and "R" to indicate a rightward direction.

[Overall Configuration]

Figure 1:
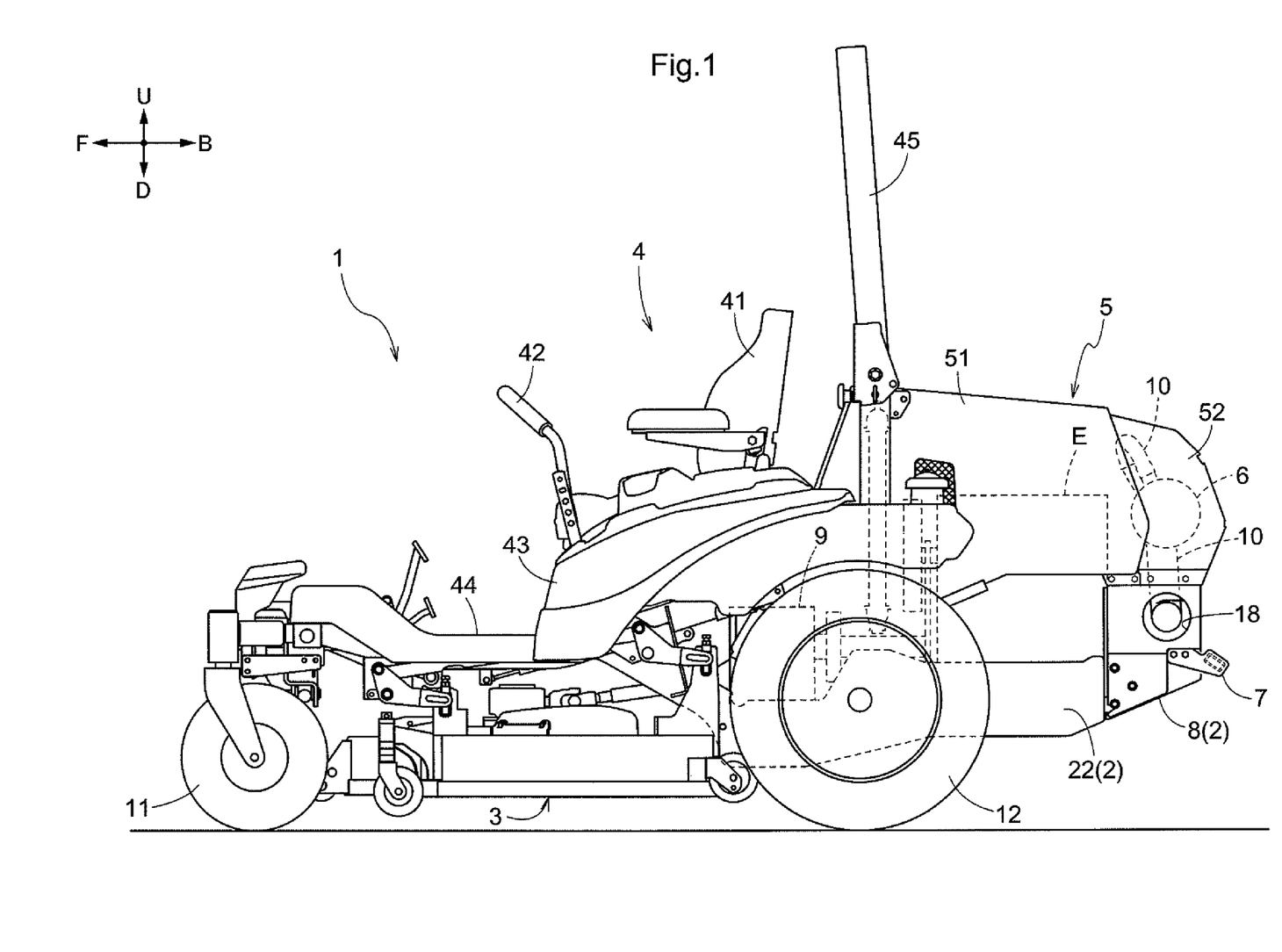
FIG. 1 is a side view of a riding-type mower.

FIG. 1 illustrates a riding-type mower including a body 1 with a body frame 2. The riding-type mower includes a front-wheel unit 11 and a rear-wheel unit 12. The front-wheel unit 11 includes driven wheels, and is supported by the body frame 2. The rear-wheel unit 12 includes driving wheels, and is supported by the body frame 2. The riding-type mower includes, between the front-wheel unit 11 and the rear-wheel unit 12, a mower unit 3 suspended from the body frame 2 with a link mechanism in-between. The riding-type mower includes a driver section 4 at a central portion of the body 1 in the front-back direction. The driver section 4 includes, for example, a driver's seat 41 for a driver to sit on and a pair of left and right control levers 42. The riding-type mower includes two fenders 43 respectively to the left and right of the driver section 4, a floor 44 forward of the driver section 4, and a ROPS 45 backward of the driver section 4.

The riding-type mower includes, at a back portion of the body 1 (which is backward of the driver section 4), a hood 5, an exhaust gas cleaning device 6, a bumper 7, an engine E, a cooling fan 13, and an air cleaner 14. The hood 5 contains, for example, the exhaust gas cleaning device 6, the engine E, the cooling fan 13, and the air cleaner 14.

[Frame Structure]

Figure 2:
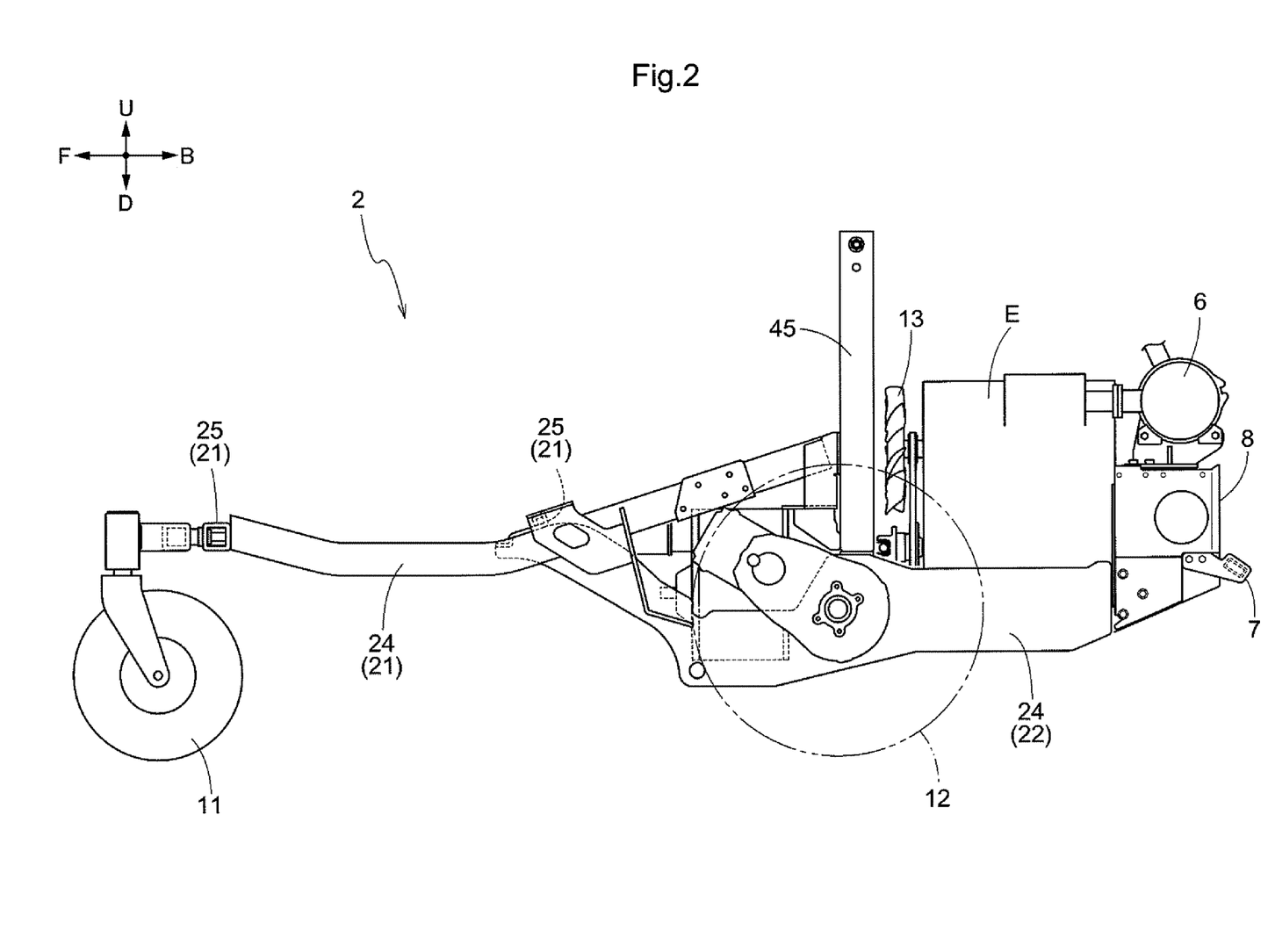
FIG. 2 is a side view of a body frame of a riding-type mower, illustrating how different parts of the body frame are positioned.
Figure 3:
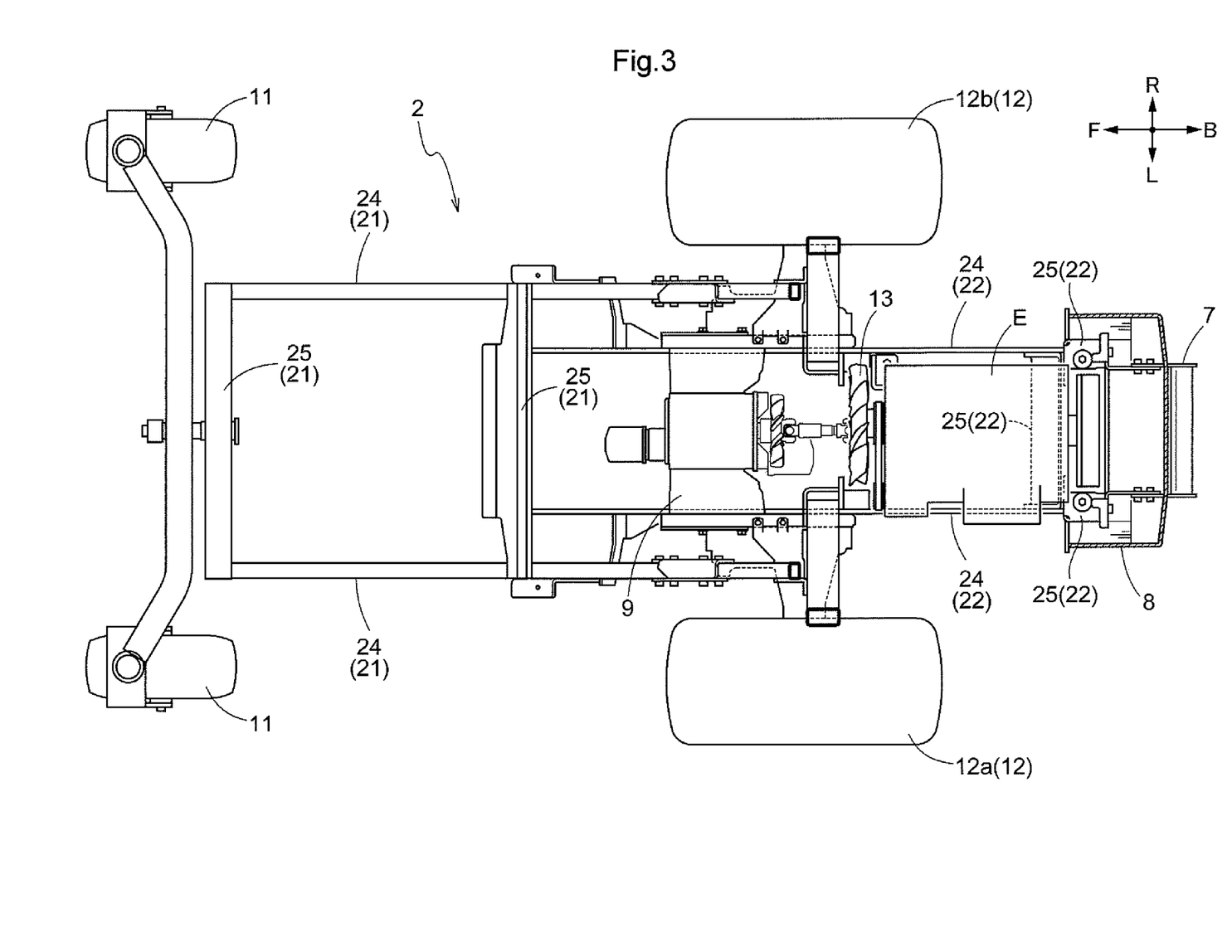
FIG. 3 is a plan view of a body frame of a riding-type mower, illustrating how different parts of the body frame are positioned.
Figure 4:
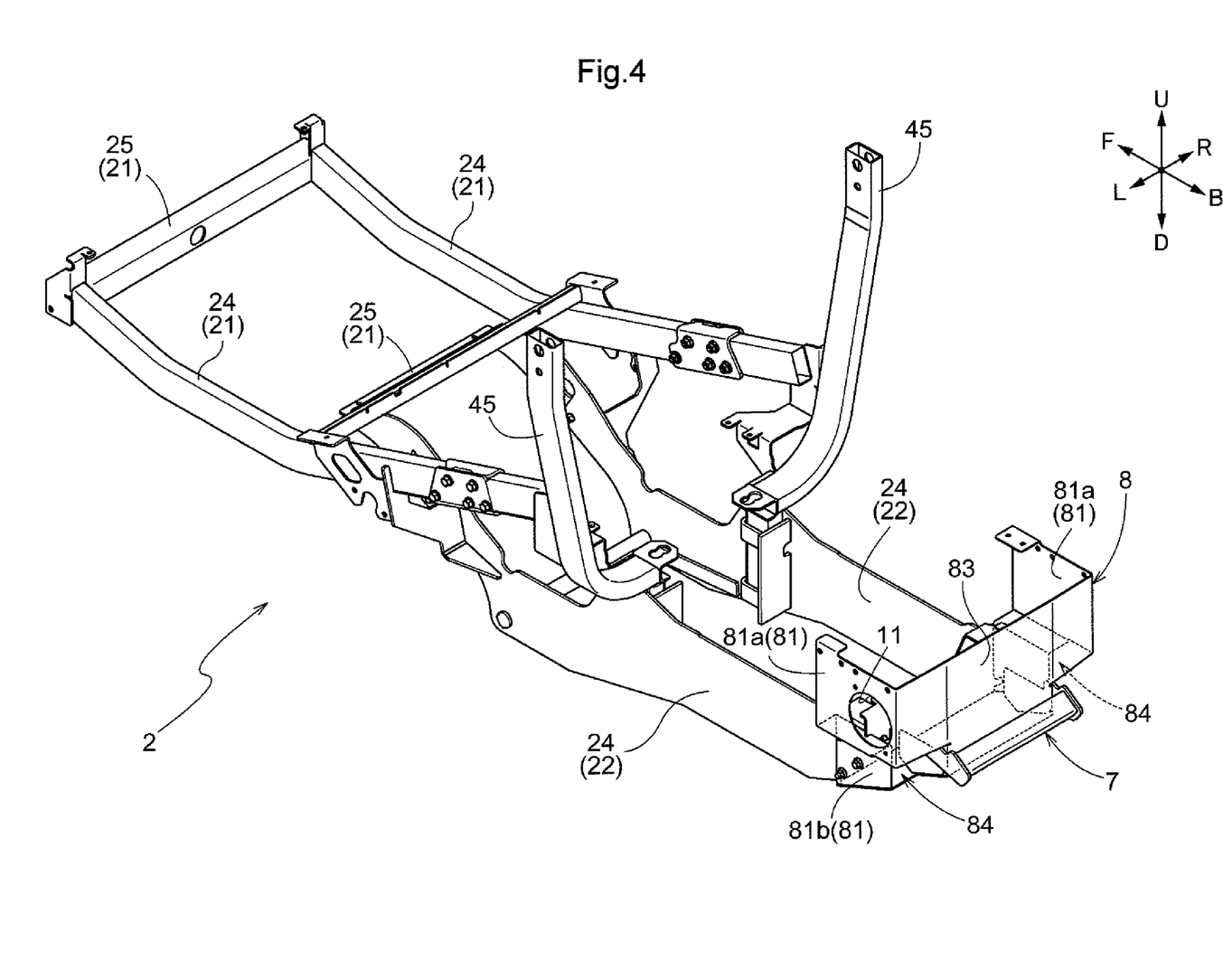
FIG. 4 is a perspective view of a body frame of a riding-type mower, illustrating how different parts of the body frame are positioned.

As illustrated in FIGS. 2, 3, and 4, the body frame 2 includes a first frame 21 positioned forward, a second frame 22 positioned backward, and a third frame 8 backward of the engine E. The first frame 21 is wider (that is, larger in the left-right direction) than the second frame 22. The first frame 21 and the second frame 22 each include a pair of left and right main frame members 24 extending in the front-back direction of the body 1 and auxiliary frame members 25 each coupling the two main frame members 24 to each other. The third frame 8 is in the shape of a box that defines a space backward of the engine E. The second frame 22 has a front portion positioned under a back portion of the first frame 21 in a plan view, and is coupled to the first frame 21 with use of a coupling member (not illustrated in the drawings). The third frame 8 is coupled to a back end portion of the second frame 22, specifically, to an auxiliary frame member 25 at a back end portion of the second frame 22. The third frame 8 overlaps with a back end portion of the second frame 22 in a plan view. The bumper 7 is detachably fixed to a back end portion of the second frame 22.

[Engine and Other Devices Therearound]

Figure 5:
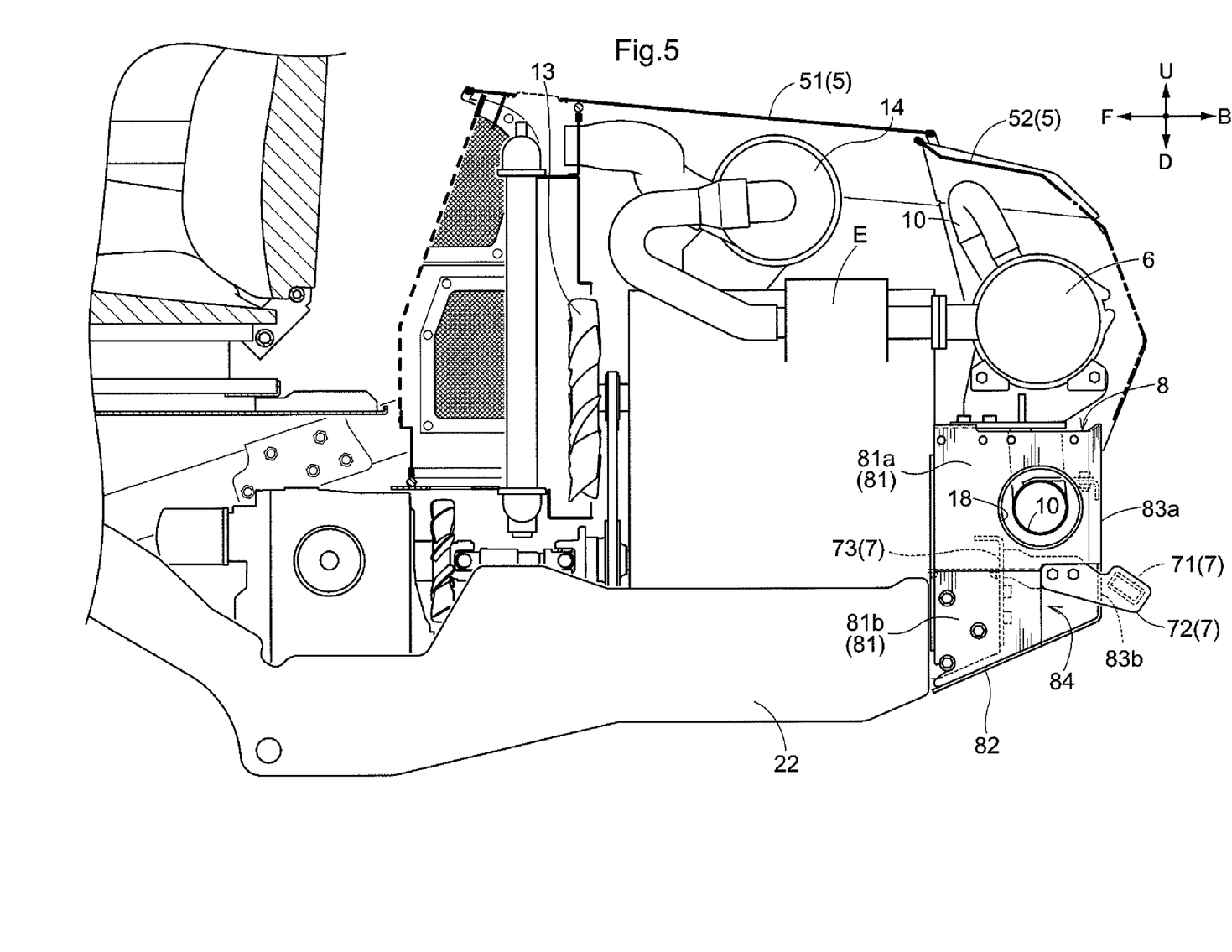
FIG. 5 is a cross-sectional side view of main parts of an embodiment of the present invention, illustrating how the main parts are positioned relative to one another.

As illustrated in FIGS. 1 and 5, the engine E is supported by the second frame 22 with a vibration isolator in-between. The riding-type mower includes a transmission device 9 under the driver section 4 and forward of the engine E. The transmission device 9 includes an input shaft (not shown) configured to receive motive power from the engine E and a PTO shaft (not shown) configured to transmit motive power to the mower unit 3. The cooling fan 13 is forward of the engine E, and is configured to blow cooling air. The exhaust gas cleaning device 6 is backward of the engine E, and is configured to remove particulate matter from exhaust gas with use of a diesel particulate filter (DPF). The air cleaner 14 is over the engine E.

[Hood]

As illustrated in FIG. 5, the hood 5 is over the body frame 2 to define an engine room. The hood 5 includes a first hood portion 51 covering the cooling fan 13, the air cleaner 14, and the engine E and a second hood portion 52 covering the exhaust gas cleaning device 6. The hood 5 has a top face inclined with a back portion lowered. The cooling fan 13 blows cooling air, which flows backward along the top face of the first hood portion 51 and then along the back face of the second hood portion 52 to downward of the exhaust gas cleaning device 6.

The second hood portion 52 is fixed to the third frame 8. The first hood portion 51 is movable rotationally about an axis along the left-right direction of the body 1 to be opened and closed. The back face of the second hood portion 52 has a plurality of openings 17 through which to dissipate heat of the exhaust gas cleaning device 6.

[Third Frame]

Figure 6:
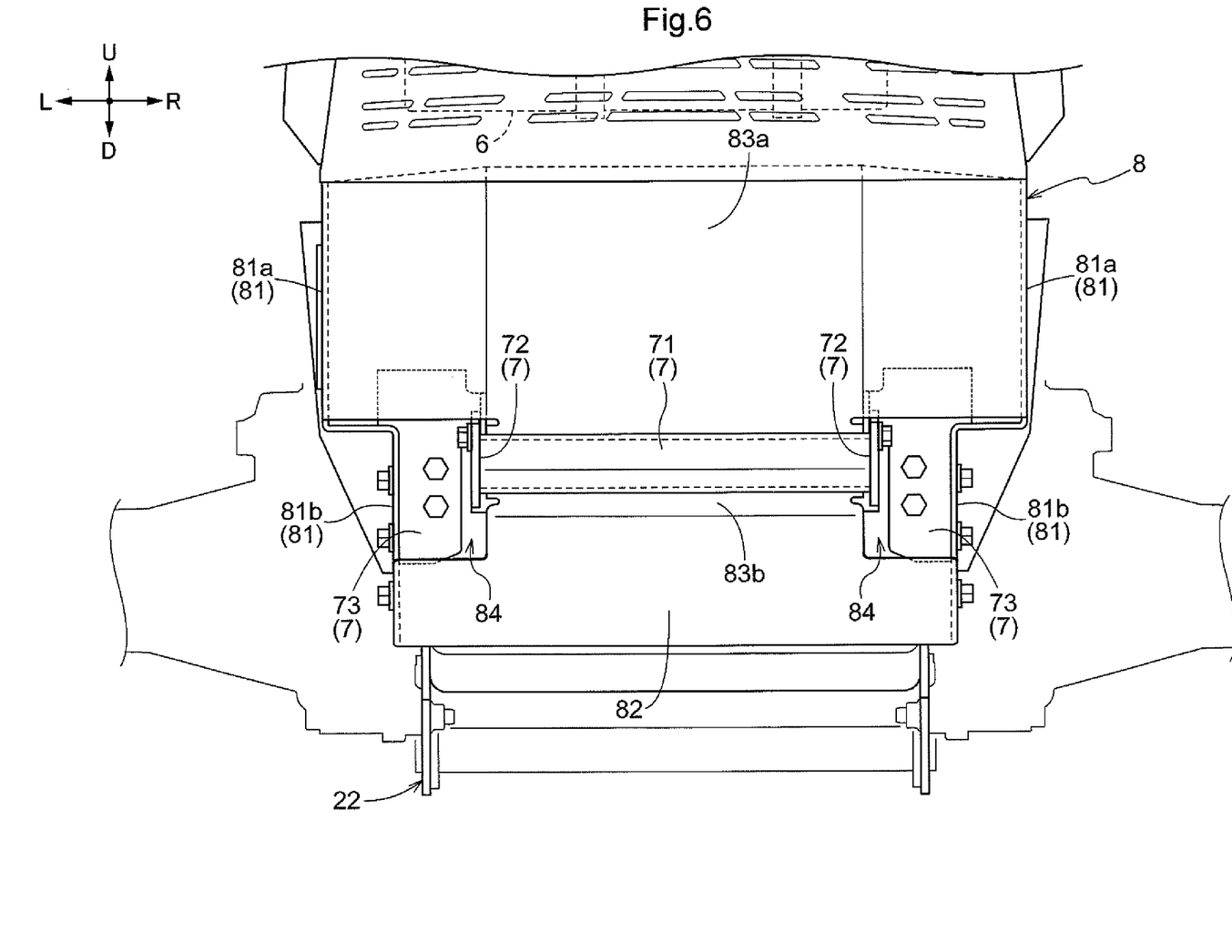
FIG. 6 is a rear view of main parts of an embodiment of the present invention, illustrating how the main parts are positioned relative to one another.

As illustrated in FIGS. 5 and 6, the third frame 8 includes (i) a pair of side face portions 81 each providing a side face, (ii) a bottom face portion 82 inclined with a back portion lifted, and (iii) a back face portion 83 providing a back face. The third frame 8 has an open top, and is covered from above by the second hood portion 52. The third frame 8 has an exhaust port 18, and contains an exhaust duct 10 configured to carry exhaust gas from the exhaust gas cleaning device 6 to the exhaust port 18 to be discharged from the body 1. The third frame 8 for the present embodiment has an exhaust port 18 in a side face portion 81. The exhaust gas cleaning device 6 is over the exhaust port 18.

As illustrated in FIGS. 5 and 6, the third frame 8 is in the form of a single plate-shaped member bent to form a pair of side face portions 81, a bottom face portion 82, and a back face portion 83. The side face portions 81 include respective first side face portions 81*a* and second side face portions 81*b*. The first side face portions 81*a* are positioned above and separated from each other by a large distance in the left-right direction. The second side face portions 81*b* are positioned below and separated from each other by a small distance in the left-right direction. The second side face portions 81*b* are formed by bending each of the side face portions 81 into a substantial S shape such that respective lower portions are closer to each other. The back face portion 83 includes a first back face portion 83*a* and a second back face portion 83*b*. The first back face portion 83*a* is wide and positioned above. The second back face portion 83*b* is narrow and positioned below. The second back face portion 83*b* has left and right end portions positioned inward of the left and right end portions of the first back face portion 83*a* in a rear view. The bottom face portion 82 has left and right end portions continuous with respective lower end portions of the second side face portions 81*b*. The bottom face portion 82 is narrower (that is, smaller in the left-right direction) than the first back face portion 83*a* by an amount corresponding to the amount by which the second side face portions 81*b* are bent inward.

The third frame 8 has a pair of openings 84 each extending from the bottom face portion 82 to the back face portion 83. The cooling air from the cooling fan 13 flows through the hood 5 to be discharged through the openings 84 in the third frame 8. Specifically, the cooling air flows through the exhaust gas cleaning device 6 and the exhaust duct 10 to be discharged through the openings 84.

[Bumper]

Figure 7:
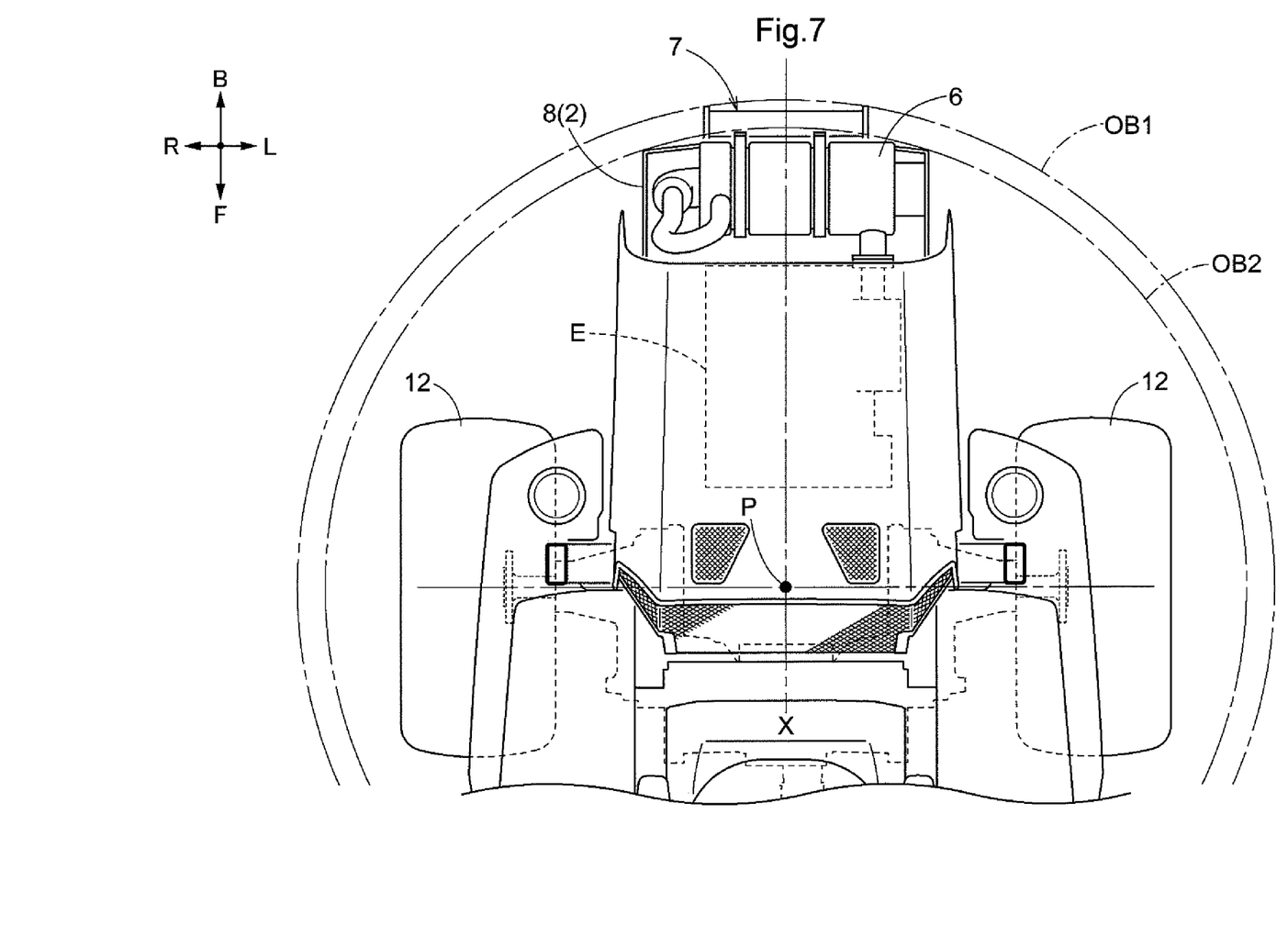
FIG. 7 is a plan view of a back portion of the body of a riding-type mower, illustrating the position of a turn circle of the body.

As illustrated in FIG. 5, the exhaust gas cleaning device 6 has a back end portion backward of the back end portion of the third frame 8 of the body frame 2. The bumper 7 has (i) a back end portion backward of the back end portion of the exhaust gas cleaning device 6, (ii) an upper end portion below the upper end portion of the third frame 8, and (iii) a lower end portion above the lower end portion of the second frame 22 of the body frame 2. As illustrated in FIGS. 6 and 7, the bumper 7 has left and right end portions positioned inward of the left and right end portions of the third frame 8 in a rear view. The exhaust gas cleaning device 6 is at a central position of the third frame 8 in a plan view, and extends in the left-right direction of the body 1. The bumper 7 is also at a central position of the third frame 8 in a plan view. In other words, the bumper 7 overlaps with the exhaust gas cleaning device 6 in the front-back direction of the body 1 in a plan view.

Figure 8:
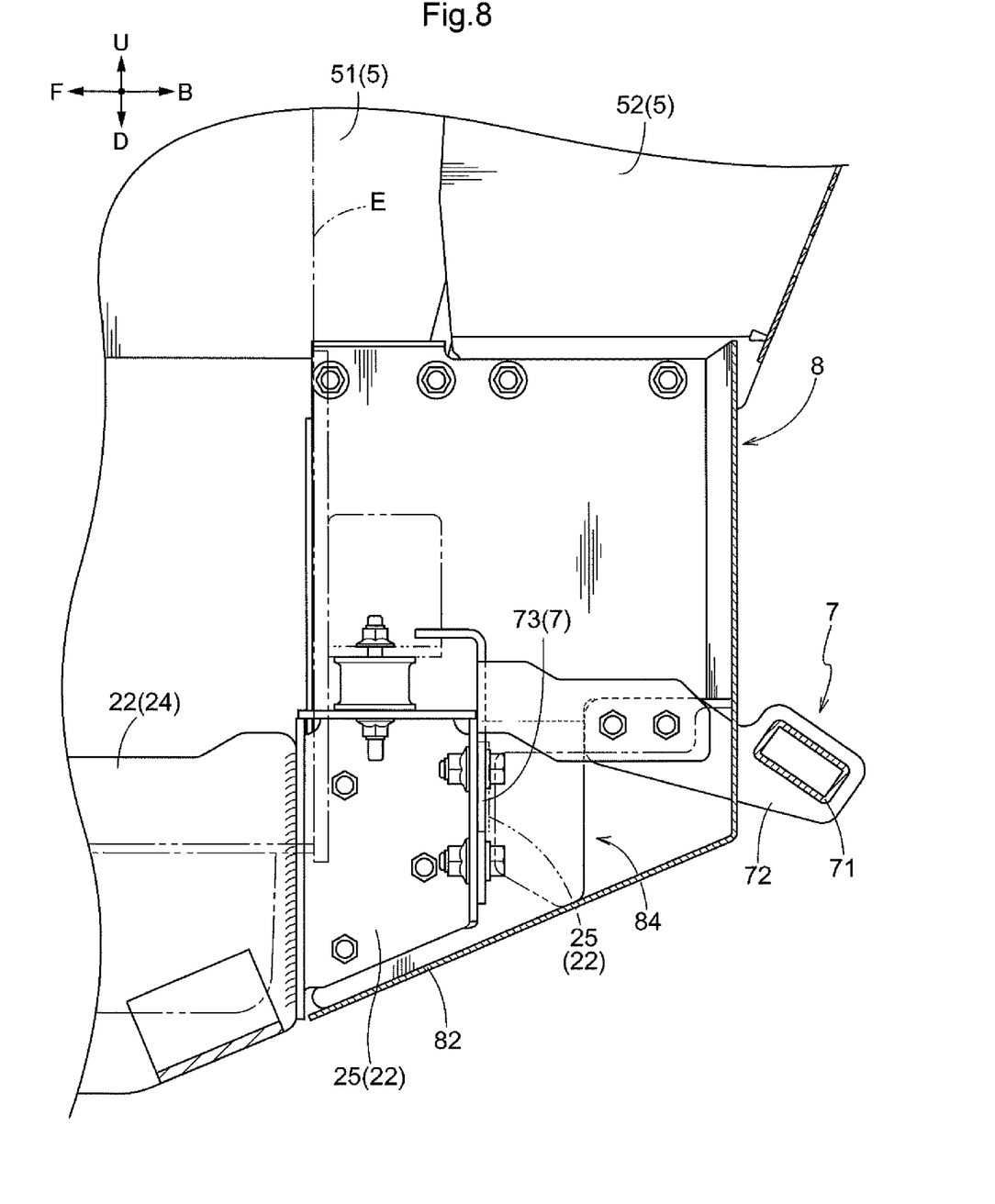
FIG. 8 is a detailed cross-sectional side view of a back portion of the body of a riding-type mower, illustrating how the bumper is attached.
Figure 9:
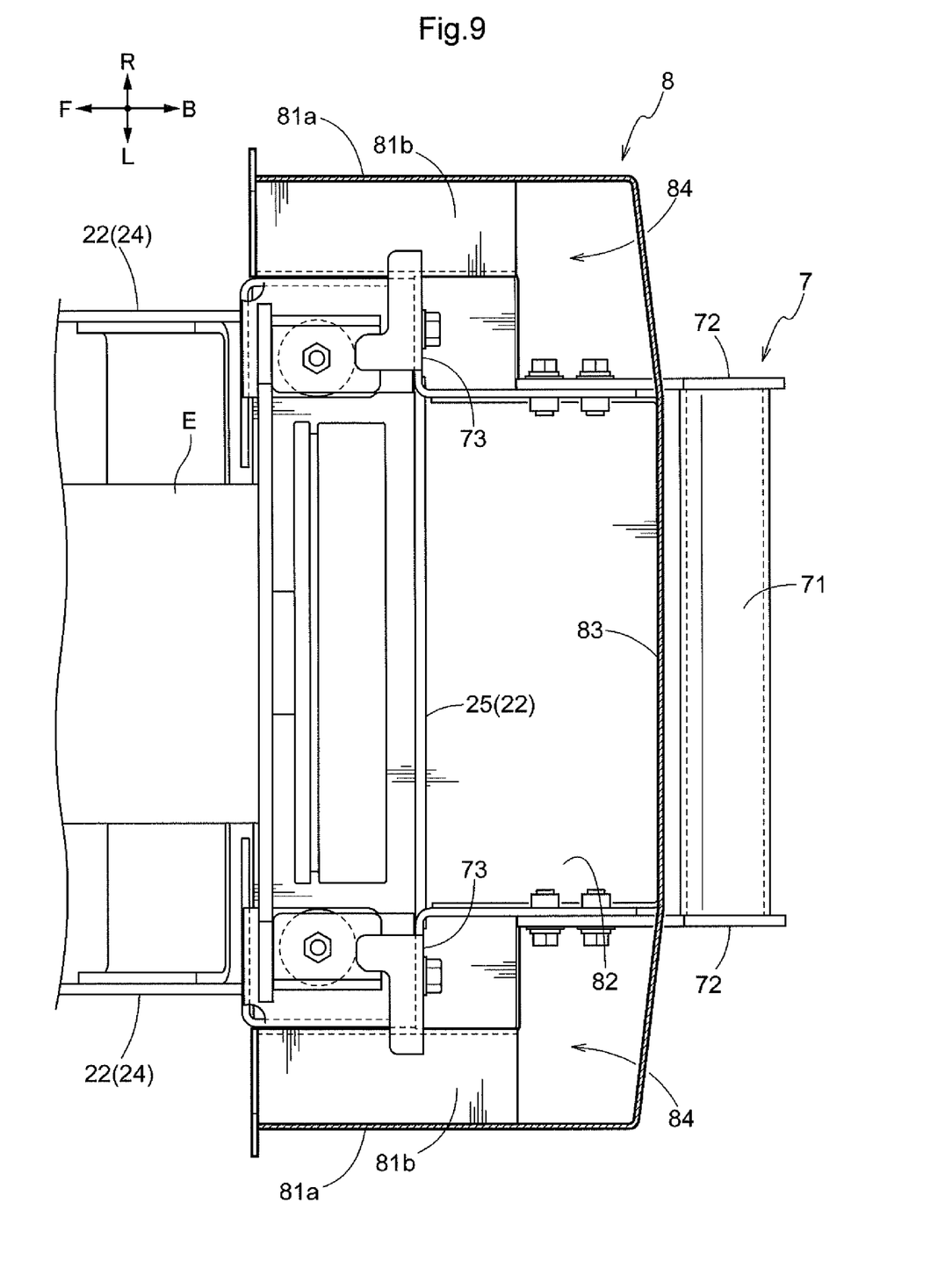
FIG. 9 is a detailed cross-sectional plan view of a back portion of the body of a riding-type mower, illustrating how the bumper is attached.

As illustrated in FIGS. 8 and 9, the bumper 7 includes a bar 71 and a pair of left and right supports 72. The bar 71 is an angular pipe extending in the left-right direction. The supports 72 are fixed to the body frame 2, extend backward from the body frame 2, and support the bar 71. The bumper 7 has a top face inclined with a back portion lowered, that is, inclined such that a portion thereof farther backward is farther lower in position. In other words, the bar 71 is supported by the supports 72 such that its top face is inclined to have a lowered back portion, that is, oriented such that a portion of the top face which portion is farther backward is lower in position. The bar 71 has left and right end portions fixed to the respective inner faces of the supports 72.

As illustrated in FIGS. 8 and 9, the supports 72 are detachably fixed to the body frame 2. The supports 72 for the present embodiment are each provided with a base end portion 73. The base end portions 73 are screwed to the auxiliary frame member 25 at a back end portion of the second frame 22, and coupled to the respective supports 72. The supports 72 each extend outward of the third frame 8 from that portion of the corresponding opening 84 which is inward in a rear view. This prevents the bumper 7 from blocking the entire openings 84 in the third frame 8. The supports 72 protrude backward from the body frame 2 by such an amount that the bar 71 has a front end portion in no contact with the third frame 8. In other words, the bar 71 has a front end portion separated from the back end portion of the third frame 8.

The transmission device 9 includes a pair of left and right hydrostatic transmissions (HSTs) (not shown). The HSTs (notshown) are configured to steplessly change (increase or decrease) motive power from the engine E in both the normal drive and the reverse drive and transmit the resulting motive power respectively to a first rear wheel 12a of the rear-wheel unit 12 on the left side and a second rear wheel 12b of the rear-wheel unit 12 on the right side. The control levers 42 include a left control lever 42a and a right control lever 42b. The left control lever 42a is for use to adjust the rotation speed of the first rear wheel 12a, whereas the right control lever 42b is for use to adjust the rotation speed of the second rear wheel 12b. The left control lever 42a and the right control lever 42b are each swingable to a forward-travel speed change section, a neutral position, and a backward-travel speed change section.

The left and right HSTs (not shown) are configured to vary power on the basis of control signals generated in response to a swing of the left control lever 42a and the right control lever 42b, respectively. The user can operate the left control lever 42a and the right control lever 42b so that the rear-wheel unit 12 is in any one of a stop state, a straight travel state, a gentle turn state, a pivot turn state, and a spin turn state. In the stop state, the first rear wheel 12a and the second rear wheel 12b are stopped. In the straight travel state, the first rear wheel 12a and the second rear wheel 12b are driven to rotate in the normal or reverse direction at an equal speed. In the gentle turn state, the first rear wheel 12a and the second rear wheel 12b are driven to rotate in the normal or reverse direction at respective speeds different from each other. In the pivot turn state, one of the first rear wheel 12a and the second rear wheel 12b is stopped, whereas the other is driven to rotate in the normal or reverse direction. In the spin turn state, one of the first rear wheel 12a and the second rear wheel 12b is driven to rotate in the normal direction, whereas the other is driven to rotate in the reverse direction. Moving the left control lever 42a and the right control lever 42b to the neutral position sets the left and right HSTs (not shown) into the neutral state.

In the pivot turn state, the body 1 pivots about the first rear wheel 12a or the second rear wheel 12b. In the spin turn state, the body 1 spins about substantial the middle of the distance between the first rear wheel 12a and the second rear wheel 12b. The front-wheel unit 11 is in the form of a pair of left and right caster wheels, each with a direction freely changeable about a vertical axis. The caster wheels are directed in accordance with the direction in which the riding-type mower travels as the first rear wheel 12a and the second rear wheel 12b are driven.

[Turn Circle of Bumper]

As illustrated in FIG. 7, the present embodiment is configured such that the back end of the body 1 (that is, the back end of the bumper 7) is apart from the turn center P by a distance larger than the distance by which each of the left and right ends of the body 1 (that is, each of the left and right ends of the rear-wheel unit 12) is apart from the turn center P. When the body 1 spins, its back end draws a turn circle OB1, which will be larger with a larger distance between the back end of the bumper 7 and the turn center P. In other words, the turn circle OB1 will be larger as the bumper 7 protrudes farther backward from the body frame 2. A smaller turn circle will allow the driver to more easily perceive what is backward of the body 1 when changing the direction of the body 1.

As illustrated in FIG. 7, the turn circle OB1 is outward of a turn circle OB2, which is drawn by the back end of the body frame 2 when the body 1 spins. With the bumper 7 protruding backward from the body frame 2 by a given amount, the turn circle OB1 will be larger as the bumper 7 is wider (that is, larger in the left-right direction). The present embodiment is configured such that the bumper 7 have left and right ends on the turn circle OB1. The bumper 7 thus has a largest possible width that does not expand the turn circle OB1.

With the bumper 7 protruding backward by a given amount and having a given width, the turn circle OB1 will be larger, that is, the bumper 7 will have a back end farther apart from the turn center P, as the bumper 7 has its center farther apart from the center of the back end of the body 1 in a plan view. The present embodiment is configured such that as illustrated in FIG. 7, an imaginary line X connecting the turn center P with the center of the bumper 7 extends through substantially the middle of the back end of the body frame 2 in a plan view. This means that the bumper 7 is at the middle of the third frame 8 in a plan view for a smallest possible turn circle OB1.

Alternative Embodiments (1) The specific embodiment described above is a riding-type mower. The present invention is, however, applicable to any work machine such as a tractor, a combine, and a harvester.

(2) The specific embodiment described above is configured such that the hood 5 includes a first hood portion 51 and a second hood portion 52 as separate members. The hood 5 may alternatively be made up of a single, undivided member instead. Further, the first hood portion 51 and the second hood portion 52 may be movable.

(3) The specific embodiment described above is configured such that the exhaust gas cleaning device 6 includes a DPF. The exhaust gas cleaning device 6 may, however, include any member configured to clean exhaust gas from the engine. The exhaust gas cleaning device 6 may include, for example, a member configured to reduce the amount of nitrogen oxide in exhaust gas through a selective catalytic reduction (SCR) process.

(4) The specific embodiment described above is configured such that the bumper 7 includes a pair of left and right supports 72 supporting a bar 71. The bumper 7 may alternatively include a single support 72 or three or more supports 72.

Figure 10:
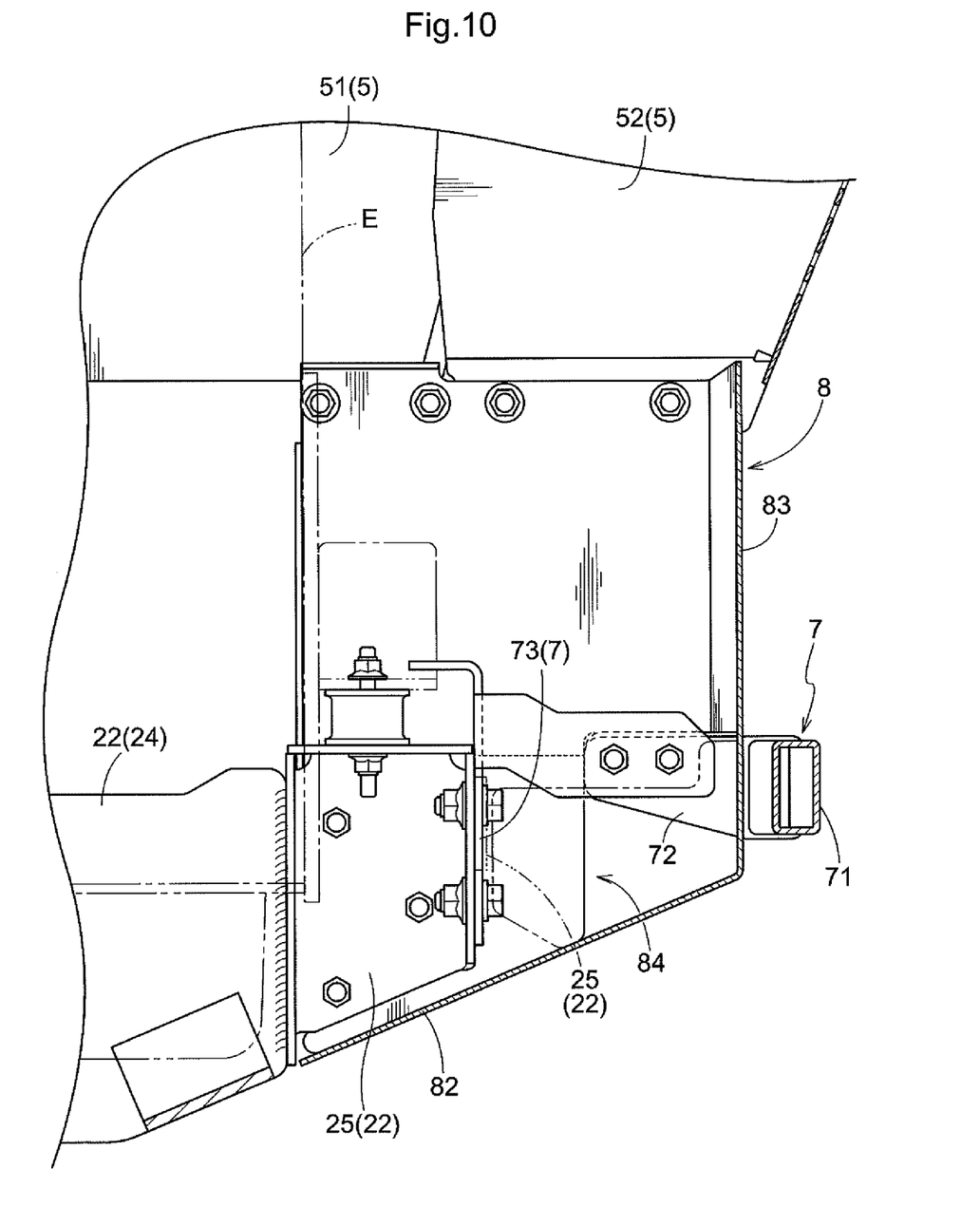
FIG. 10 is a detailed cross-sectional side view of a back portion of the body of a riding-type mower as an alternative embodiment of the present invention.
Figure 11:
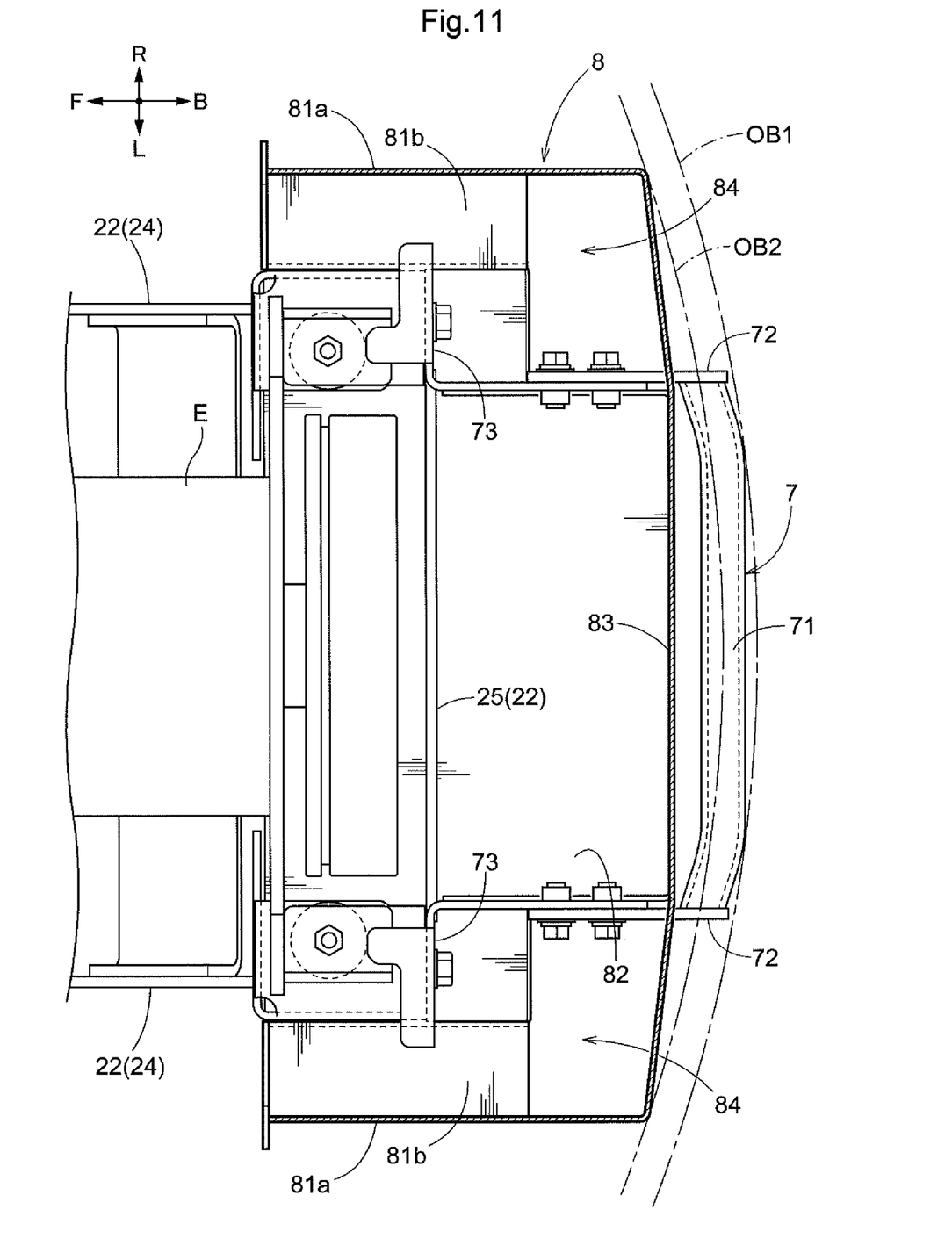
FIG. 11 is a detailed cross-sectional plan view of a back portion of the body of a riding-type mower as an alternative embodiment of the present invention.

(5) The specific embodiment described above is configured such that the bar 71 of the bumper 7 is an angular pipe. The bar 71 may alternatively be in a different shape such as a round bar, or be curved forward to extend along the turn circle OB1 as illustrated in FIGS. 10 and 11.

(6) The specific embodiment described above is configured such that the bar 71 is supported by the supports 72 such that its top face is inclined to have a lowered back portion, that is, oriented such that a portion of the top face which portion is farther backward is lower in position. The bar 71 may alternatively be supported by the supports 72 in such an orientation that its top face extends horizontally as illustrated in FIGS. 10 and 11.

(7) The specific embodiment described above is configured such that the bumper 7 is fixed to the second frame 22. The bumper 7 may alternatively be fixed to another portion of the body frame 2 such as the third frame 8.

(8) The specific embodiment described above is configured such that the supports 72 are each provided with a base end portion 73 as a separate member fixed to the second frame 22. The supports 72 may alternatively be each integral with a base end portions 73.

The invention claimed is:

1. A work machine, comprising:
a body including:
a body frame;
an exhaust gas cleaning device disposed at a back portion of the body; and
a bumper disposed at a back portion of the body and extending backward,
wherein the exhaust gas cleaning device has a back end backward of a back end of the body frame,
wherein the bumper has (i) a back end backward of the back end of the exhaust gas cleaning device and (ii) an upper end below an upper end of the body frame, and
wherein the bumper has a top face inclined such that a portion of the bumper positioned further from the back end of the body frame is lower in a vertical direction than a portion of the bumper positioned closer to the back end of the body frame.

2. The work machine according to claim 1, wherein the bumper has left and right ends inward of left and right ends of the body frame in a rear view.

3. The work machine according to claim 1, wherein the bumper has a lower end above a lower end of the body frame.

4. The work machine according to claim 1, wherein the bumper includes:
two supports including a left support and a right support, fixed to the body frame, and extending backward; and
a bar extending in a left-right direction and supported by the supports.

5. The work machine according to claim 4, wherein the bar has left and right ends fixed inward of the supports.

6. The work machine according to claim 5, wherein the supports are detachably attached to the body frame.

7. The work machine according to claim 1, wherein the body frame includes:
a first frame positioned forward,
a second frame positioned backward the first frame, and
a third frame positioned backward the second frame and backward of the engine.

8. The work machine according to claim 1, wherein the exhaust gas cleaning device has the back end backward of a back end of a backmost portion of the body frame.

9. The work machine according to claim 7, wherein the exhaust gas cleaning device has the back end backward of a back end of the third frame.

10. The work machine according to claim 1, wherein the bumper has the back end backward of the back end of the body frame.

11. The work machine according to claim 7, wherein the bumper has the back end backward of the back end of the third frame.

* * * * *